United States Patent Office 3,434,358
Patented Mar. 25, 1969

3,434,358
MECHANICAL DRIVES
Peter Charles Wildy and Donald Wilson, Camberley, England, assignors to Southern Instruments Limited, Camberley, Surrey, England, a British company
Filed Sept. 13, 1966, Ser. No. 579,022
Claims priority, application Great Britain, Oct. 1, 1965, 41,685/65; Mar. 18, 1966, 12,091/66
Int. Cl. F16h 25/18
U.S. Cl. 74—103
6 Claims

ABSTRACT OF THE DISCLOSURE

A mechanical drive which includes a driven member mounted for rotation about an axis and carrying a lever member having an arcuate peripheral portion which is frictionally engaged by a driving member in a tangential direction at right angles to the axis of the driven member, the driven member being mounted for movement in a rectilinear path so that movement of the driving member causes rolling contact and rotation of the driven member the driving and driven members being clamped together without imparting a reaction thrust to the driven member.

Figure 1:
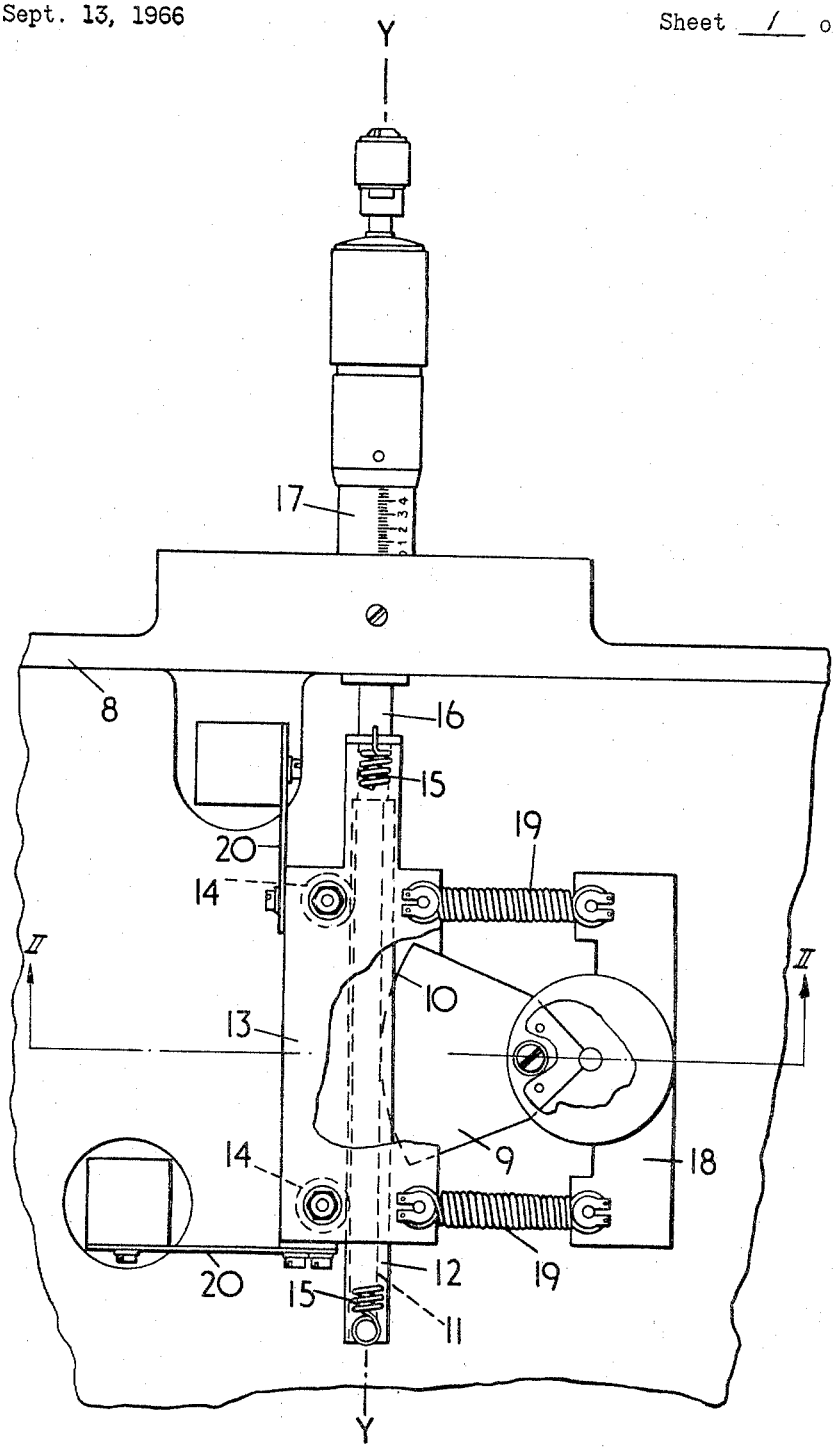

This invention relates to mechanical drives used for converting rectilinear movement into rotary movement, and is concerned more particularly with such drives intended to be used in devices where the rotary movement must be imparted with the utmost precision, such as in scientific instruments.

Whilst little difficulty is experienced in designing such precision drives when the mathematical relationship between the imparted rectilinear movement and the consequent angular movement is immaterial, difficulties arise when the relationship must be linear. This feature is of particular advantage, for example, in a monochromator employing a plane diffraction grating whose dispersion varies linearly with respect to the incident light and thus the angular position of the grating is directly proportional to the wavelength of the light diffracted in a given direction, since the rectilinear movement may then be calibrated directly in wavelength units on a linear scale.

It is an object of the present invention to provide an improved mechanical drive in which the required linear relationship may be obtained conveniently and easily with the desired degree of precision.

The present invention consists in a mechanical drive which includes a driven member mounted for rotation about an axis and fixed to a lever having an arcuate periphery tangentially engaging a surface on a driving member mounted for rectilinear movement in the tangential direction at right angles to the said axis of rotation, wherein clamping means are provided for clamping between them the driving and driven members so that the periphery of the lever and the surface of the driving member are urged into contact without imparting a reaction thrust to the rotatable mounting of the driven member, movement of the driving member causing rolling contact and rotation of the driven member.

The advantage of obtaining a linear relationship in this way may, in practice, prove to be of only limited value since the dispersion of a plane diffraction grating is truly linear over only a small angle of rotation of the grating. In practice it has been found that an angular rotation from 0° to about 15° will give approximately linear dispersion, but at higher angles the dispersion becomes noticeably non-linear.

As an example, a grating angle of 15° when using a 15,000 line per inch grating, will correspond to a wavelength of approximately 9000 A. and over a useable range of say 1850 to 9000 A. a drive having a linear relationship will permit the drive to be calibrated linearly in terms of Angstrom units. However, if a 30,000 line per inch grating is used, a grating angle of 15° corresponds only to about 4.500 A. and for wavelengths above this a linear drive will introduce an error which at 9000 A. will amount to about 350 A., the true wavelength being less than that indicated by the linear scale of the drive. For this reason it is desirable to provide a mechanical drive in which overall a non-linear relationship may be introduced into at least part of the operating range of the drive.

The invention further consists in a mechanical drive as set forth in the preceding paragraph wherein the said driving member is adapted to be moved rectilinearly under the influence of a further driving member through the intermediary of a corrector element interposed between and in contact with the two driving members, the corrector element being mounted for movement with the driving members in the direction of the rectilinear movement and also for movement in a direction at right angles to it as a consequence of the rectilinear movement, and the corrector element being tapered for at least a portion of its length so that for operation over this portion the distance between the two adjacent ends of the driving members is varied upon movement of the driving members in the direction of rectilinear movement.

Figure 2:
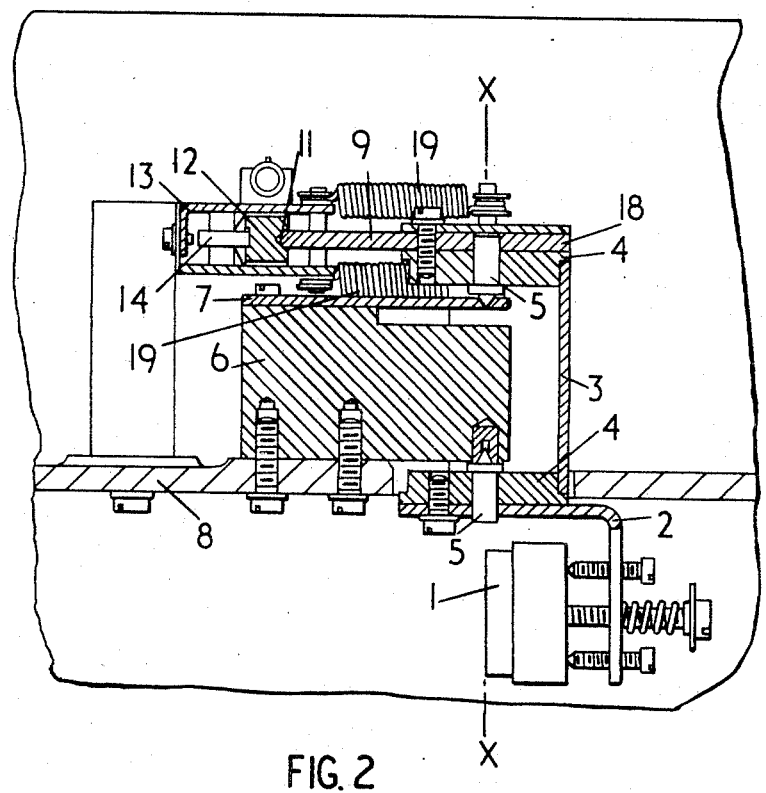
Figure 3:
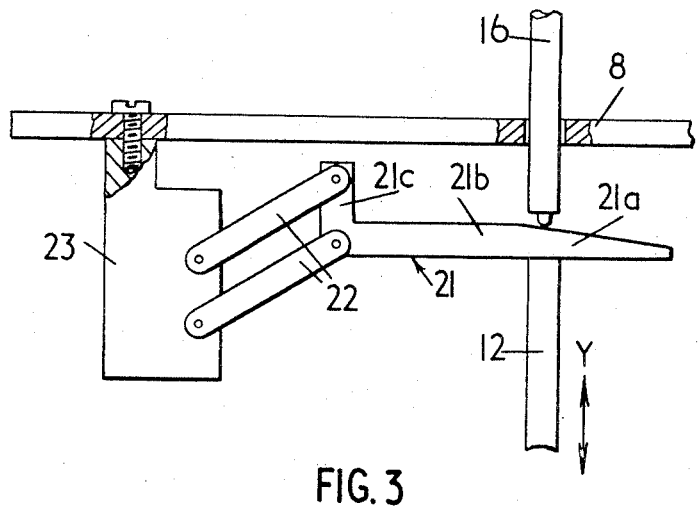

In the accompanying drawings:
FIGURE 1 is a plan view of a mechanical drive according to the present invention;
FIGURE 2 is a vertical section through the apparatus of FIGURE 1 taken on line II—II, and
FIGURE 3 shows a modification to the drive of FIGURE 1.

In carrying the invention into effect according to one convenient mode by way of example, FIGURES 1 and 2 of the accompanying drawings show a mechanical drive used for rotating a diffraction grating in a monochromator using a Czerny-Turner or Ebert mounting.

The grating 1 is adjustably mounted upon a bracket 2 secured to a driven member in the form of a rotatable assembly consisting of a part-cylindrical shell 3 having end pieces 4. The assembly carries pivot pins 5 engaging a fixed block 6 and plate 7 secured to the main framework 8 of the device. In this way the assembly and thus the grating 1 can be freely rotated about the axis X—X defined by the pins 5.

Secured to the end piece 4 is a sector-shaped lever 9 having an arcuate periphery 10 which engages tangentially a V-shaped groove 11 in a driving member 12. The member 12 is guided in a frame 13 by low friction bearings 14, in order to minimise the loading on a micrometer drive, for rectilinear movement in a direction Y—Y, the member 12 being urged upwardly (as shown in FIGURE 1) by tension spring 15 into engagement with the lower end of a screw 16 having a micrometer scale 17.

The frame 13 and a plate 18 lying in the plane of the lever 9 and engaging pivot pin 5 constitute together with tension springs 19 clamping means by which the lever 9 and the member 12 are strongly thrust together without imparting a reaction thrust onto the pivot pins 5.

The frame 13 is anchored to the main framework 8 by means of leaf springs 20.

It will be appreciated that by rotation of the micrometer screw 16 the driving member may be caused to move in the direction Y—Y, and by virtue of its rolling contact with the periphery 10 of lever 9, the grating 1 will be rotated through an angle linearly related to the movement of screw 16. By suitable choice of dimensions, the micrometer may be calibrated to read directly in units of wavelength. Backlash may be virtually eliminated by the biasing of the member 12 against the end of the micrometer screw 16 under the influence of spring 15.

Since no loading is applied to the pivot pins 5 a very high contact pressure between the member 12 and the lever 9 may be applied by springs 19, thereby preventing any slip between the two and enabling reproducible wavelength readings to be obtained to within an accuracy of ±1 angstrom.

As has been explained previously, it may be of advantage to provide a drive in which overall a non-linear relationship is introduced into at least part of the operating range of the drive. To this end, FIGURE 3 shows the arrangement of FIGURE 1 modified by the insertion of a corrector element 21 between the member 12 and the screw 16, which element has a tapered portion 21a, a flat portion 21b, and a flanged portion 21c.

The element 21 is mounted for movement by means of a parallel linkage consisting of four parallel bars 22 each pivotally connected at one end to the flanged portion 21c and at the other end to a supporting block 23 mounted upon the framework 8 of the device.

The dimensions are such that when the screw 16 is fully screwed in the bars 22 are approximately parallel to the framework 8 and the flat portion 21b of the element 21 is positioned between the member 12 and the screw 16.

As the screw 16 is moved out, due to the parallel linkage the element 21 moves back with the member 12 and screw 16 and also is drawn transversely across at right angles to the direction Y—Y of rectilinear movement.

For the initial part of the movement, the flat portion 21b of the element 21 is between the member 12 and screw 16, thereby imparting a linear drive in spite of the transverse movement of element 21, but a point is reached (corresponding say to a grating angle of 15°) when the wedge portion 21a is interposed between the member 12 and screw 16.

After this, further outward movement of the screw 16 will cause increased angular rotation for a given rectilinear movement due to the decreasing thickness of the wedge portion 21a. Moreover, due to the parallel linkage and the increasing angular rotation of the bars 22 the movement of the corrector element 21 is itself not linear, but will be withdrawn more rapidly as the screw 16 is drawn out, thereby further increasing the angular rotation.

In this way, the angle and shape of the wedge portion 21a can be chosen to provide suitable correction to the angle of rotation of the grating, thereby enabling the linear scale of the micrometer to be related directly to a linear wavelength scale.

It will be appreciated that in the arrangement of FIGURE 3 the linear drive from member 12 is still preserved, but that the overall drive is non-linear due to the presence of element 21.

We claim:

1. A mechanical drive which includes a driven member, means mounting the driven member for rotation about an axis, a lever member fixed to said driven member and having an arcuate peripheral portion, a driving member frictionally engaging said arcuate peripheral portion in a tangential direction at right angles to said axis of rotation of the driven member, means for mounting said driving member for movement in a rectilinear path in the said tangential direction whereby rectilinear movement of the driving member causes rolling contact and rotation of the driven member, and clamping means for clamping together the driving and driven members so that the said peripheral portion and the driving member are urged into contact to increase the contact pressure of said frictional engagement without imparting a reaction thrust to the said driven member mounting means.

2. A mechanical drive according to claim 1, wherein said arcuate peripheral portion engages in a groove defined in the said driving member.

3. A mechanical drive according to claim 1, wherein the said clamping means includes a plate positioned on the side of driven member remote from the driving member mounting means and engaging a pivot for the driven member, and means urging together the said plate and the said driving member mounting means.

4. A mechanical drive according to claim 3, wherein the said driving member mounting means is resiliently anchored to a main housing by means of leaf springs.

5. A mechanical drive which includes a driven member, means for mounting the driven member for rotation about an axis, a lever member fixed to said driven member and having an arcuate peripheral portion, a driving member engaging said arcuate peripheral portion in a tangential direction at right angles to said axis of rotation of the driven member, means mounting said driving member for rectilinear movement in the said tangential direction whereby movement of the driving member causes rolling contact and rotation of the driven member, clamping means for clamping together the driving and driven members so that the said peripheral portion and the driving member are urged into contact without imparting a reaction thrust to the said driven member mounting means, a second driving member arranged to impart rectilinear movement to the first said driving member, a corrector element interposed between and in contact with the said first and second driving members, means mounting said corrector element for movement with the said driving members in the direction of rectilinear movement, and also for movement in a direction at right angles to said rectilinear movement as a consequence of the rectilinear movement, and a tapered portion provided on the corrector element for at least a portion of its length, whereby for operation with this portion of the corrector element between the two driving members, the distance between the two driving members is varied upon movement of the two driving members in the direction of rectilinear movement.

6. A mechanical drive according to claim 5, wherein the said corrector element mounting means includes a parallel linkage to a main housing.

References Cited
UNITED STATES PATENTS
2,703,018   3/1955   Young _____ 74—108

FRED C. MATTERN, Jr., *Primary Examiner.*

F. D. SHOEMAKER, *Assistant Examiner.*

U.S. Cl. X.R.

74—89, 89.18, 109